Patented Aug. 14, 1945

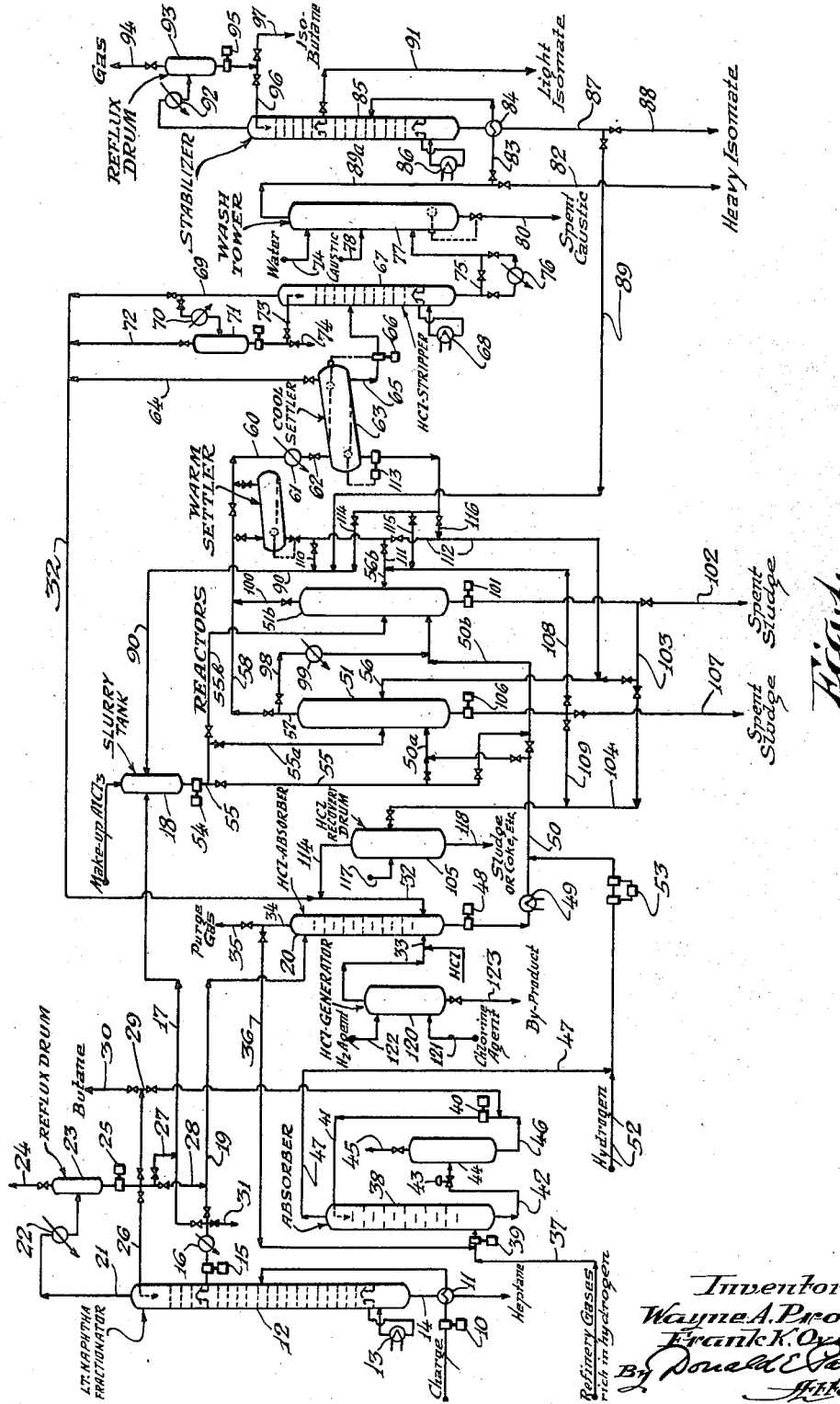

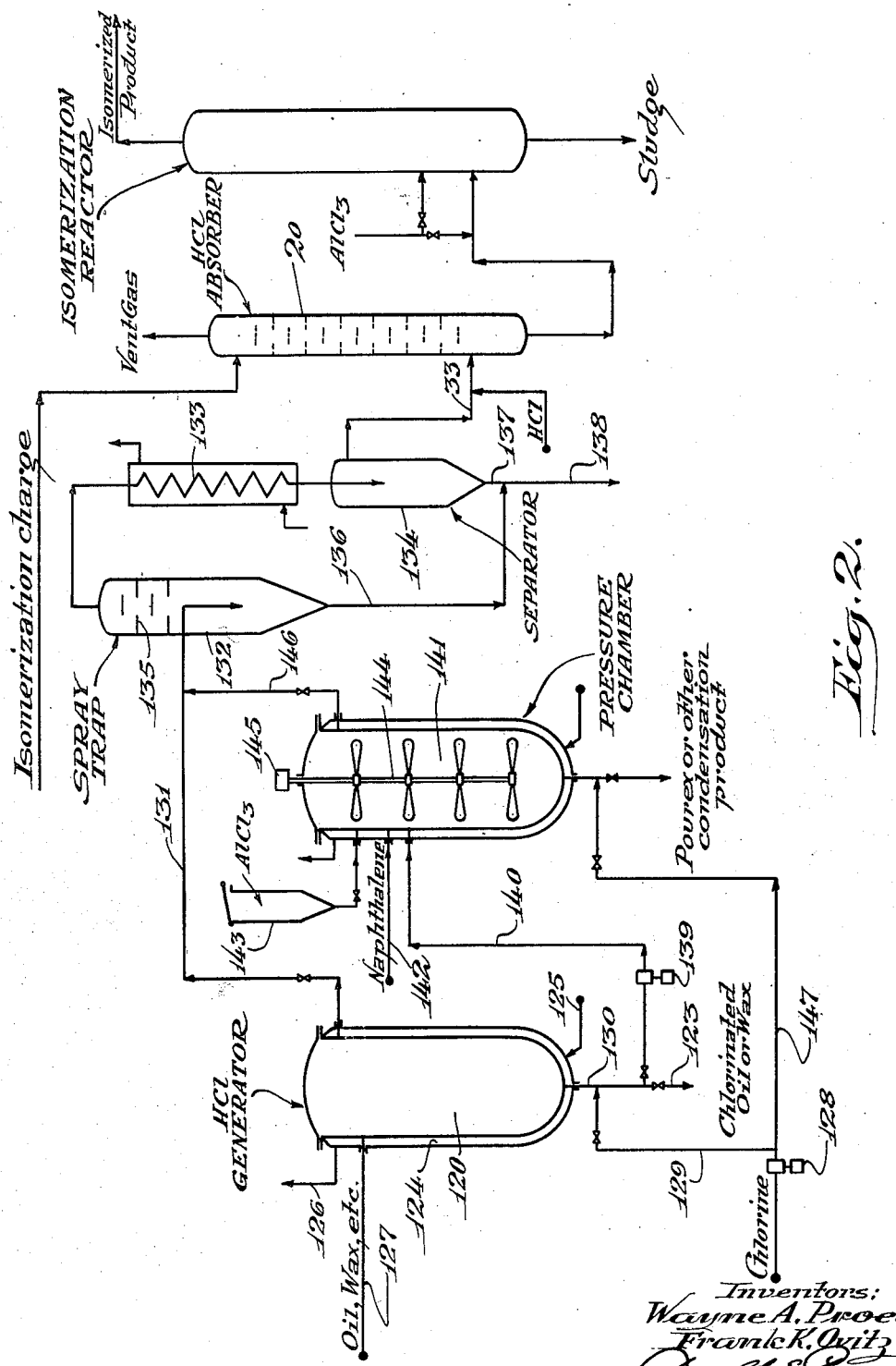

2,382,814

UNITED STATES PATENT OFFICE 2,382,814

HYDROGEN CHLORIDE-ALUMINUM CHLORIDE HYDROCARBON CONVERSION PROCESSES

Wayne A. Proell, Chicago, Ill., and Frank K. Ovitz, Whiting, Ind., assignors to Standard Oil Company, Chicago, Ill., a corporation of Indiana Application December 15, 1941, Serial No. 422,988

5 Claims. (Cl. 260—683.5)

This invention relates to improvements in hydrogen chloride-aluminum chloride hydrocarbon conversion processes and it pertains more particularly to an improved unitary system for generating and utilizing hydrogen chloride.

In certain aluminum chloride hydrocarbon conversion processes such as cracking, polymerization, alkylation, isomerization, etc. it is essential to employ hydrogen chloride as an activator. An object of our invention is to provide an improved method and means for supplying hydrogen chloride to such conversion processes or systems. A further object is to provide a new and improved unitary conversion system for both generating and utilizing hydrogen chloride. A further object is to avoid the necessity of purifying, pumping, transporting, or otherwise handling the hydrogen chloride required for aluminum chloride hydrocarbon conversion processes, such as isomerization.

A further object is to provide an improved light naphtha isomerization system wherein make-up hydrogen chloride may be supplied by chlorine gas without detriment to the catalyst activity or to the quality of the resulting isomerization products. A further object is to produce valuable by-products from hydrocarbon oils and waxes as an adjunct to a light naphtha isomerization process. A further object is to provide a unitary system of hydrogen chloride generation and utilization wherein impurities may be removed from the generated hydrogen chloride after it is introduced into the isomerization system but before it reaches the isomerization step of the system.

A further object is to provide an improved method and means for utilizing the hydrogen chloride which has heretofore been a waste product in the petroleum industry. Other objects will be apparent as the detailed description of our invention proceeds.

We will describe our invention as it is applied to a system for isomerizing paraffinic hydrocarbons of the $C_4$ to $C_6$ boiling range. In this system the charging stock absorbs hydrogen chloride from one or more gaseous streams under superatmospheric pressure within the general vicinity of 50 to 350 pounds per square inch, preferably in the general vicinity of 200 pounds per square inch. The charging stock-hydrogen chloride solution is then passed through a heat exchanger to an isomerization reactor wherein it is contacted with an aluminum chloride catalyst, preferably in the form of an aluminum chloride hydrocarbon complex, at a temperature within the approximate range of 100 to 450° F., preferably 200 to 300° F., and at a pressure within the approximate range of 500 to 1500 pounds per square inch, for example about 850 pounds per square inch. Gases are separated from reaction products and returned to the absorber for recovering hydrogen chloride for reuse but a considerable amount of hydrogen chloride is actually consumed in the process and must be either continuously or intermittently supplied thereto.

Chlorine is much less expensive and more easily handled than hydrogen chloride and chlorine gas may be introduced directly into the isomerization reactor or into the products entering said reactor for supplying the necessary hydrogen chloride; this expedient, however, is not desirable because the resulting isomerization products may be characterized by a lower octane number and because the catalyst apparently loses its activity much more rapidly when chlorine gas is introduced than when hydrogen chloride is introduced into the isomerization system.

In practicing our invention we generate the hydrogen chloride from chlorine or other chlorine supplying reagent and a hydrogen supplying reagent in a generator which forms a unitary part of the isomerization system and which discharges directly into the hydrogen chloride absorber in said system so that there is no necessity of employing any compressors for handling the hydrogen chloride gas and there is no necessity of removing hydrocarbons or other impurities from the generated hydrogen chloride gas. The hydrogen chloride absorber in the isomerization system serves the double function of removing undesirable gases from recycled gas streams and simultaneously removing undesirable gases from the generated hydrogen chloride.

Any type of hydrogen chloride generator may be employed in this system provided that it is effective in generating the hydrogen chloride at the necessary superatmospheric pressure. We may introduce an aqueous hydrochloric acid solution and sulfuric acid into an acid resistant pressure vessel, we may employ sodium chloride and sulfuric acid, we may burn chlorine gas with hydrogen under pressure. While any of these or any other methods of pressure generation may be employed we prefer to generate the hydrogen chloride by the reaction of chlorine gas on a hydrocarbon material available in petroleum refineries, utilizing the reaction $$RH + Cl_2 \rightarrow RCl + HCl$$

where R is a hydrocarbon radical of 1 to 50 or more carbon atoms. This converts about half of the introduced chlorine into hydrogen chloride and produces chlorinated hydrocarbons which may be employed as by-products for various uses. Additional hydrogen chloride may be obtained from the chlorinated hydrocarbon by the addition of a dechlorination catalyst such as aluminum chloride, barium chloride, iron chloride and the like either to give olefins in accordance with the reaction $$RCl \rightarrow R' + HCl$$

(where R' is unsaturated hydrocarbon) or to give polymers, condensation products, alkylation products, or the like in accordance with the general equation:

$$RCl + RH \rightarrow RR + HCl$$

In accordance with our invention any one or more of the above reactions are employed under superatmospheric pressure sufficient to permit the generated hydrogen chloride to be injected directly into the isomerization reaction system.

Heretofore when hydrocarbons have been chlorinated and when chlorinated wax, for instance, has been reacted with naphthalene by means of aluminum chloride to produce synthetic oils and pour point depressors, the resulting hydrogen chloride has been a by-product nuisance which simply constituted a disposal problem. In accordance with our invention the chlorination and dechlorination reactions are an integral part of a unitary conversion system.

The invention will be more fully understood from the following detailed description read in conjunction with the accompanying drawings which form a part of the specification and in which Figure 1 is a diagrammatic flow sheet of the isomerization system of which our hydrogen chloride generator is an integral part, and Figure 2 is a schematic flow diagram showing our hydrogen chloride generation system in greater detail.

While our invention is applicable to a wide variety of aluminum chloride-hydrogen chloride hydrocarbon conversion processes, it will be described in connection with a process for isomerizing a light naphtha consisting essentially of paraffinic hydrocarbons of the butane to hexane boiling range. Referring to Figure 1, a virgin naphtha charging stock is introduced by pump 10 through heat exchanger 11 to fractionating tower 12 which is provided with suitable heating means 13 at its base and which is operated under such conditions that heptanes and heavier hydrocarbons are removed from the base through line 14. A side stream consisting essentially of C5 and C6 hydrocarbons may be withdrawn by pump 15 through heater 16 and then split into two streams, the small stream passing by line 17 to slurry tank 18 and the large stream passing by line 19 to hydrogen chloride absorber 20. Where the make-up aluminum chloride is slurried with recycle material the valve in line 17 may be closed and all of the charging stock may be passed to the absorber.

Overhead from fractionator 12 is withdrawn through line 21 and cooler 22 to reflux drum 23 from which uncondensed gases may be vented through line 24. When a side stream has been withdrawn the reflux condensate will consist essentially of butane which is withdrawn from the base of the drum by means of pump 25. A portion of this reflux condensate may be returned through line 26 to serve as reflux in the top of tower 12. Reflux condensate from this source may be introduced through line 27 to line 17 or through line 28 to line 19 or it may be passed to line 29 to an absorber system or withdrawn through line 30 for use or storage elsewhere in the refinery. If desired the butane may constitute the isomerization charging stock and the heavier hydrocarbons may be withdrawn from the system through line 31.

The hydrogen chloride absorber 20 is preferably operated under a superatmospheric pressure which may range from about 50 to 350 or more pounds per square inch but which is preferably in the general vicinity of 200 pounds per square inch. A gaseous stream containing hydrogen chloride is introduced at the base of this absorber through line 32 and make-up hydrogen chloride is introduced at the base of this absorber through line 33. Unabsorbed gases chiefly hydrogen, methane, ethane, etc., leave the top of the absorber through line 34 and may be vented from the system through line 35 or introduced through line 36 together with additional hydrogen containing gases from line 37 into the base of absorber 38, a suitable compressor 39 being employed for this purpose. Butane from line 29 is introduced by pump 40 and line 41 to the top of absorber 38. This absorber may be provided with suitable baffles or bubble plates and it may be operated at a temperature of about 100° F. and a pressure of about 900 pounds per square inch. Gaseous hydrocarbons are absorbed and introduced through line 42 and pressure reducing valve 43 into separating chamber 44 which may operate under about 35 pounds pressure. Hydrocarbon gases may be purged from the system through line 45 and the butane from the base of the separator may be returned through line 46, pump 40 and line 41 back to the top of the absorber. Hydrogen leaves the top of the absorber through line 47.

The charging stock-hydrogen chloride solution from the base of absorber 20 is pumped by pump 48 through heater 49 and lines 50 and 50a into isomerization reactor 51. Hydrogen from line 47 or from outside source 52 is introduced by compressor 53 either into line 50 or directly into reactor 51. About 100 to 300, for example about 200 cubic feet of hydrogen is charged to the reactor per barrel of light naphtha charged thereto. Make-up aluminum chloride in the form of a slurry, solution or complex is introduced into reactor 51 either from slurry tank 18 by means of pump 54 and line 55 or from other parts of the system through line 56.

The reactor contains a large amount of aluminum chloride catalyst material which is usually in the form of an aluminum chloride hydrocarbon complex. The charging stock passes upwardly through this catalyst material in finely divided dispersed phase at a space velocity of about .2 to 4 volumes of liquid charging stock per hour per volume of catalyst material. The temperature in the reactor is within the range of 100 to 400° F. and is usually in the general vicinity of 250° F. The pressure in the reactor is in the range of 500 to 1500 pounds per square inch and may be about 850 pounds per square inch. Reaction products are withdrawn from the top of reactor 51 through lines 57 and 58 to warm settler 59 and thence through line 60, cooler 61 and pressure reducing valve 62 to cool settler 63. Gases leave the top of the cool settler through line 64 and are returned by line 32 to hydrogen chloride absorber 20.

Clear product liquids leave the cool settler through line 65 and are introduced by pump 66 into hydrogen chloride stripper column 67 which is provided with a suitable heating means 68 at its base. The overhead from this stripper may be passed through line 69 to line 32 for recycling or may be passed through cooler 70 to reflux drum 71. Gases from the top of this drum pass by line 72 and line 32 to the hydrogen chloride absorber 20 and liquids from the base of this drum may either be returned by line 73 for use as reflux in the top of the stripper or may be withdrawn through line 74. The product from line 74 contains isobutane and when it is passed to an aluminum chloride alkylation system it is unnecessary that dissolved hydrogen chloride be removed therefrom. Stripper tower 67 may thus function both as a hydrogen chloride stripper and as a stabilizer tower.

Liquid products from the base of tower 67 are passed directly by line 75 or through cooler 76 to caustic scrubber and wash tower 77. Caustic may be introduced through line 78 and the water through line 79. The wash water may be trapped out above the caustic inlet or the water and caustic may both be removed from the base of the tower through line 80.

The neutralized and water washed product is withdrawn from the top of the wash tower through line 81 and it may either be withdrawn from the system through line 82 or passed through line 83 and heat exchanger 84 to stabilizer or fractionating tower 85 which is provided with a suitable heating means 86 at its base. Heavy isomate or hydrocarbon material may be withdrawn from the base of the stabilizer through line 87 and removed from the system through line 88 or returned through lines 89 and 90 to slurry tank 18. A light isomate may be withdrawn as a side stream from tower 85 through line 91.

Overhead from the stabilizer is passed through cooler 92 to reflux drum 93 from which gases may be vented through line 94. A portion of the reflux may be returned by pump 95 through line 96 to the top of the stabilizer and a light fraction consisting, for example, chiefly of isobutane may be withdrawn from the system through line 97.

Instead of employing a single reactor we may employ a multiple reactor system. Thus charging stock with absorbed hydrogen chloride may be introduced through line 50b to reactor 51b and make-up catalyst may be added to this reactor through line 55b or through line 66b. Alternatively, the products leaving the top of reactor 51 may be passed by line 98 through cooler 99 and to reactor 51b and the products from the top of reactor 51b may be passed through line 100 and line 58 to warm settler 59.

Relatively spent catalyst from the base of reactor 51b may be withdrawn by pump 101 and either withdrawn from the system through line 102, passed by lines 103 and 56 to reactor 51 or passed through lines 103 to line 104 to hydrogen chloride recovery drum 105. Catalyst may be withdrawn from the base of reactor 51 by pump 106 and either withdrawn from the system through line 107, passed to reactor 51b through line 108 or passed to the hydrogen chloride recovery drum through lines 109 and 104.

Settled catalyst material from settler 59 may be passed through lines 110 and 90 to slurry tank 18 or through lines 111 and 56b to reactor chamber 51b or through lines 112 and 56 to reactor 51. Precipitated catalyst material from cool settler 63 may be pumped as a slurry by pump 113 through lines 114 and 90 to slurry tank 18 or through lines 115 and 56b to reactor 51b or through lines 116 and 56 to reactor 51.

Our invention is primarily concerned with the supplying of make-up hydrogen chloride to the isomerization system hereinabove described. A part of this make-up hydrogen chloride may be recovered from spent sludge in recovery drum 105 by adding sulfuric acid or water from line 117 to hydrolyze such sludge. If water is employed it should be used in less than stoichiometric amounts in order that the recovered hydrogen chloride may be anhydrous. Sulfuric acid will produce more anhydrous hydrogen chloride from the sludge and should, therefore, be used particularly in refineries which are provided with a sludge coker for sulfuric acid recovery. The sludge or coke is withdrawn from the recovery drum through line 118 and the recovered hydrogen chloride is passed by line 119 to line 32 for reintroduction at the base of hydrogen chloride absorber 20.

Even this amount of recovered hydrogen chloride is usually insufficient to supply the requirements of the isomerization process and an outstanding feature of our invention is the use of a high pressure hydrogen chloride generator as an integral part of our unitary isomerization system. Such a generator is schematically illustrated in Figure 1 by pressure chamber 120 into which a chlorine supplying reagent is introduced through line 121 and a hydrogen supplying reagent is introduced through line 122. By-products are removed from this pressure chamber through line 123 and the generated hydrogen chloride is introduced directly from the top of this chamber through line 33 to the hydrogen chloride absorber 20. Since generator 120 operates at a slightly higher pressure than absorber 20 no pump, blower or compressor will be required in hydrogen chloride line 33. Furthermore, it will be unnecessary to remove extraneous gases from the generated hydrogen chloride because these gases will be removed from the system with purge gases leaving the top of the absorber 20.

Pressure vessel 120 may be an acid resistant kettle into which sodium chloride is introduced through line 121 and sulfuric acid is introduced through line 122. Instead of employing sodium chloride we may employ aqueous hydrochloric acid (for example 22° muriatic acid). Generators of this type are already known to the art and no invention is claimed in such generators per se. Our invention contemplates the operation of such generators as a unitary part of the isomerization system and under such pressure as to discharge the generated hydrogen chloride directly into the hydrogen chloride absorber 20.

A preferred hydrogen chloride generator for use in this system is schematically illustrated in Figure 2. In this system generator 120 is a glass lined or corrosion resistant pressure vessel which may be provided with a jacket 124 into which steam or other heat exchange fluid may be introduced through line 125 and from which such fluid may be withdrawn through line 126. A hydrocarbon such as oil or wax may be introduced into the jacket through line 127. Such oil or wax should be free from moisture and in some cases it may be necessary or desirable to blow it with air or pass it through a salt drum for removing water before charging it into chamber 120. Chlorine is charged to this chamber from a pressure drum or by means of pump 128 through lines 129 and 130 until the pressure in the chamber is slightly higher than the pressure in absorber 20. When this pressure is reached the valve in line 131 is opened so that the generated hydrogen chloride may pass through spray trap 132, cooler 133 and separator 134 and thence through line 33 directly into the base of absorber 20. Baffles 135 may be employed in the upper part of spray trap 132 and sufficient cooling may be employed in cooling coils 133 to insure the removal of any normally liquid hydrocarbons or chlorinated hydrocarbons from the gaseous stream. Liquids may be removed from the base of spray traps 132 through line 136 and from the base of separator 134 through line 137 and may be withdrawn from the system through line 138. Any gaseous impurities in the generated hydrogen chloride will be eliminated from the system by vent gases leaving the top of absorber 20.

After the oil or wax has been chlorinated to the required extent the valve in line 131 may be closed and the chlorinated product may be withdrawn from chamber 120 through line 123. We may, however, introduce the chlorinated wax by means of pump 139 through line 140 to a second pressure vessel 141 which is also jacketed for temperature control. Naphthalene may be added to chamber 141 through line 142 and aluminum chloride or other catalyst material may be added to this vessel from hopper 143. This pressure vessel may be provided with a rapid stirrer 144 driven by a suitable motor 145 and a condensation reaction may then be effected in reactor 141 as described, for example, in United States Patents 1,963,917–18. The hydrogen chloride which is liberated in this reaction passes by line 146 to line 131 and thence to the hydrogen chloride absorber 20 as hereinabove described.

Instead of employing separate reactors for the chlorination and dechlorination steps, both of these steps may be effected in the same reactor, for example, by first introducing wax through line 140 to pressure chamber 141, effecting the chlorination by introducing the chlorine through line 147, then adding the naphthalene and catalyst and effecting the dechlorination in the same reaction vessel. Alternatively, one reaction vessel may be on-stream while the other is being charged, emptied or cleaned. A continuous chlorine generation system may be employed instead of the batch systems hereinabove described. Other modifications and equivalents will be apparent to those skilled in the art from the above detailed description.

It should be pointed out that a considerable excess of hydrogen chloride may be tolerated in the isomerization system and that this hydrogen chloride is merely recycled from the product separation step back to the absorber. The amount of hydrogen chloride introduced into the isomerization reactor may range from about 3% to 10% or more by weight based on light naphtha charged. Thus it is not essential that the make-up hydrogen chloride be added through line 33 at a uniform rate and one of the features of our process is the fact that the isomerization system is not disturbed by interruptions in the supply of make-up hydrogen chloride or by the periodic injection of relatively large amounts of make-up hydrogen chloride. The isomerization system acts as a storage reservoir to accommodate fluctuations in the production of hydrogen chloride and its requirements are adequately met if the hydrogen chloride concentration in the oil leaving absorber 20 does not fall materially below about 3%.

It will thus be seen that we have not only solved the problem of hydrogen chloride disposal in a chlorination and condensation reaction but we have provided a unitary combination of such system with a light naphtha isomerization system. Our invention is not limited to any of the details or specific operating conditions hereinabove set forth except as defined by the following claims.

We claim:

1. In a process for producing saturated paraffinic hydrocarbons of branched-chain structure from hydrocarbon charging stocks by means of an aluminum chloride catalyst activated by hydrogen chloride, the improved method of operation which comprises introducing a hydrocarbon charging stock at the upper part of an absorption zone at a presure within the general vicinity of 50 to 350 pounds per square inch, introducing a hydrogen chloride gas stream containing gaseous impurities at a low point in said absorption zone, said impurities being less soluble than hydrogen chloride in said charging stock, withdrawing charging stock containing dissolved hydrogen chloride from the base of said absorption zone, heating the withdrawn solution and contacting it with said catalyst for effecting a conversion to produce saturated paraffinic hydrocarbons of branched-chain structure, separating from said products a gas stream containing hydrogen chloride and gaseous impurities less soluble in the charging stock than hydrogen chloride and returning said stream from introduction at said low point in said absorption zone, separately generating make-up hydrogen chloride containing gaseous impurities less soluble in the charging stock than hydrogen chloride under superatmospheric pressure, introducing said generated make-up hydrogen chloride and gaseous impurities as a gas stream at a low point in said absorption zone directly from said generating step without compression and without liquefaction, and withdrawing from the top of said absorption zone unabsorbed gaseous impurities introduced thereto with said hydrogen chloride streams.

2. The method of claim 1 wherein said gaseous impurities are hydrogen and hydrocarbon gases which method includes the further steps of introducing gases from the top of said absorption zone into a low point of a second absorption zone operated at higher pressure, introducing absorber liquid at an upper point in said second absorption zone for removing hydrocarbon impurities, withdrawing hydrogen from the top of said second absorption zone and, introducing said hydrogen into said conversion zone.

3. The method of claim 1 wherein at least a part of the hydrogen chloride is generated by chlorinating a hydrocarbon.

4. The method of claim 1 wherein at least a part of the hydrogen chloride is generated by dechlorinating a chlorinated hydrocarbon.

5. The method of claim 1 wherein at least a part of the hydrogen chloride is generated by hydrolyzing relatively spent catalyst material from the conversion step.

WAYNE A. PROELL.
FRANK K. OVITZ.